United States Patent
Casas et al.

(10) Patent No.: US 8,429,621 B2
(45) Date of Patent: *Apr. 23, 2013

(54) COMPONENT LOCK TRACING BY ASSOCIATING COMPONENT TYPE PARAMETERS WITH PARTICULAR LOCK INSTANCES

(75) Inventors: Juan M Casas, Round Rock, TX (US); Saurabh Nath Sharma, Austin, TX (US); Basu Vaidyanathan, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/431,382

(22) Filed: Mar. 27, 2012

(65) Prior Publication Data

US 2012/0185860 A1 Jul. 19, 2012

Related U.S. Application Data

(63) Continuation of application No. 12/409,992, filed on Mar. 24, 2009.

(51) Int. Cl.
*G06F 9/44* (2006.01)
(52) U.S. Cl.
USPC .......................................................... 717/128
(58) Field of Classification Search ........................ None
See application file for complete search history.

(56) References Cited

U.S. PATENT DOCUMENTS

| | | | |
|---|---|---|---|
| 5,594,904 A | 1/1997 | Linnermark et al. |
| 5,659,757 A | 8/1997 | Browning et al. |
| 6,067,587 A | 5/2000 | Miller et al. |
| 6,101,569 A | 8/2000 | Miyamoto et al. |
| 6,182,244 B1 | 1/2001 | Bankemper et al. |
| 6,467,050 B1 | 10/2002 | Keung |
| 6,593,940 B1 | 7/2003 | Petersen et al. |
| 6,594,683 B1 | 7/2003 | Furlani et al. |
| 6,823,511 B1 | 11/2004 | McKenney et al. |
| 2004/0024797 A1 | 2/2004 | Berry et al. |
| 2007/0067777 A1 | 3/2007 | Branda et al. |

OTHER PUBLICATIONS

Petersen, Jr, Donald W.; "IMS Automation Using ACO SolutionPac and Netview Release 3" Document No. GG24-3533; International Technical Support Center; Oct. 1990; 203 Pages; Poughkeepsie, New York, USA.

"Dynamic Tracing" PostgreSQL 8.2.11 Documentation; http://www.postgresql.org:80/docs/8.2/static/dynamic-trace.html.

"Parallel and Distributed Systems: Testing and Debugging"(PADTAD—3);IBM Verification Conference; Nov. 15, 2005; IBM Research Lab Haifa, Israel.

Woods, Ed; "The DB2 Trace Facility and OMEGAMON II for DB2 Historical Collection Considerations" CCR2, Issue No. 7; 2004; International Business Machines, USA.

Woods, Ed; "OMEGAMON II for DB2 Lock History Considerations" CCR2,Issue No. 6 2004 International Business Machines; USA.

(Continued)

*Primary Examiner* — Keith Vicary
(74) *Attorney, Agent, or Firm* — D'Ambrosio & Menon, PLLC

(57) ABSTRACT

Methods for lock tracing at a component level. The method includes associating one or more locks with a component of the operating system; initiating lock tracing for the component; and instrumenting the component-associated locks with lock tracing program instructions in response to initiating lock tracing. The locks are selected from a group of locks configured for use by an operating system and individually comprise locking code. The component lock tracing may be static or dynamic.

7 Claims, 6 Drawing Sheets

OTHER PUBLICATIONS

"DTrace Topics Locks"; http://www.solarisinternals.com/wiki/index.php/DTrace_Topics_Locks.

Cantrill, Bryan M.; Shapiro, Michael W., Leventhal, Adam H.; "Dyanmic Instrumentation of Production Systems" Solaris Kernel Development, Sun Microsystems; 14 pages.

Bodden, Eric, Hendren, Laurie, Lam, Patrick; "Finding Programming Errors Earlier by Evaluating Runtime Monitors Ahead-of-Time" Nov. 2008 FSE 2008.

"A Dynamic Tracing Mechanism for Performance Analysis of OpenMP Applications" Series: "Lecture Notes in Computer Science;" 14 pages; vol. 2104/2001; Springer, Berlin, Germany.

USPTO Office Action dated Apr. 5, 2012 for parent U.S. Appl. No. 12/409,992.

Caubet, Jordi et al; "A Dynamic Tracing Mechanism for Performance Analysis of OpenMP Applications" 2001; 14 pages; vol. 2104/2001; Springer, Berlin, Germany.

Darmawan et al. (AIX 5L Performance Tools Handbook); Redbooks; Aug. 2003.

IBM (AIX 5L Version 5.2—Performance Management Guide); SC23-4876-00; Sixth Edition (May 2004).

Fetzer, Christof; "Race Detection Using Static and Dynamic Analysis"; 49 pages, TU Dredsen; http://www.se.inf.tu-dresden.de/data/courses/ss06/SFT/SFT-lecture13-2006.pdf.

Final Office Action dated Jul. 18, 2012 for parent U.S. Appl. No. 12/409,992.

COMPONENT LOCK TRACING BY ASSOCIATING COMPONENT TYPE PARAMETERS WITH PARTICULAR LOCK INSTANCES

PRIORITY

This application is a continuation of U.S. patent application Ser. No. 12/409,992 filed Mar. 24, 2009.

BACKGROUND

Operating systems are responsible for the management and coordination of activities of a computer and the distribution of the computer's limited resources. Typically, resources are shared between many software applications running in the environment of the operating system. Often the operating system employs locking code (or simply 'locks') to reserve a resource for use by a particular process. The lock reserves (or locks) the resource, the lock holder uses the resource, and then the lock on the resource is released when the lock holder is finished.

Locks are often a cause of software errors that negatively affect the operation of the computer. A classical situation is that of a deadlock, where a process cannot meet a condition to move to another state, such as when a process fails to release the lock and other processes will continue to wait for the resource. In another type of deadlock, two threads are unable to proceed because each one of them is waiting for something to be done by the other. For example, the deadlock may occur when a first thread is waiting for a variable that has already been locked by a second thread, and at the same time the second thread is waiting for another variable that has already been locked by the first thread. Another type of deadlock occurs when a process has the lock, but doesn't realize it, and thus continues to wait for the lock.

SUMMARY

Generally, the present disclosure relates to lock analysis at a component level. More specifically, embodiments of the invention enable lock tracing on abstract groupings of locks. Using a functional abstraction, lock tracing may be enabled on all the locks of one or more particular components of the operating system simultaneously. Thus, malfunctions in a particular component can be analyzed for lock errors by analyzing all the locks of the component.

Methods are disclosed for component lock analysis. Generally, the method includes associating one or more locks with a component of the operating system; initiating lock tracing for the component; and instrumenting the component-associated locks with lock tracing program instructions in response to initiating lock tracing. The locks are selected from a group of locks configured for use by an operating system and individually comprise locking code.

In some embodiments, a computer-implemented method includes providing a group of locks configured for use by an operating system. The locks are associated with a component of the operating system and individually comprise locking code. The method further includes initiating lock tracing for the component; and instrumenting the component-associated locks with lock tracing program instructions in response to initiating lock tracing.

In a first general embodiment, the component lock tracing is static. At development time, all the locks used by a component are grouped at a component level. In specific embodiments, components are designated in an invocation of a software module. The software module may then be invoked to instrument the locks with trace code.

In a second general embodiment, the component lock tracing is dynamic. Associating the locks with the component, which comprises a component code listing, is carried out at development time by mapping locations of locks in the component code listing and associating the mapped lock locations with the component in a data structure. The lock locations may be obtained by parsing the component code listing. At runtime, a dynamic trace tool dynamically injects the lock tracing program instructions into the component-associated locks.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION

In information technology, Reliability, Availability and Serviceability ('RAS') of an Operating System ('OS') may be one of the major customer requirements. RAS capabilities have generally been well deployed in the processor hardware, but having these features in the OS increases the value of RAS. Generally, First Failure Data Capture ('FFDC') captures information to diagnose a root cause in case of a system fault.

In embodiments of the present invention, several areas of the OS may be modified to capture enough data at various strategic points so the data could provide valuable information when the actual fault occurs. The OS could incorporate various capabilities like error checking, OS component trace, OS component live dump, error recovery, and so on, that could potentially offer better RAS features to a system. The OS could consist of various components and could form a component hierarchy. Each component could then support different RAS capabilities, such as Error Checking, Component Trace, and so on, and each capability could have RAS attributes associated with them. The values of these attributes could then be tuned to control the RAS capability of the OS. These attribute values could then be set to a specified component (subsystem), helping to acquire enough data if FFDC is not sufficient to determine the cause of the fault or even performance degradation in some situations.

Embodiments of the present invention implement lock tracing at a component level. Any group of locks, such as, for example, all the locks of one or more particular components of the operating system (e.g., a subsystem) may be enabled simultaneously. Thus, malfunctions in a particular component can be analyzed for lock errors by analyzing all the locks of the component. In some implementations, component lock tracing may be integrated as part of the greater RAS capabilities and RAS infrastructure provided by the AIX operating system. In some embodiments, component lock tracing may be implemented on a problematic component, if FFDC failed to identify the cause of an error. Lock tracing may be enabled and the problematic code executed again. Component lock tracing may alternatively be applied to subsystems of an operating system without RAS functionality, not to be limited to any particular operating system.

When OS components highly rely on locks (e.g., simple, complex, or distributed locks), enabled or disabled, deadlock problems degrade system performance. In contrast to previous tools for lock analysis either at process level or at a lock level, embodiments of the present disclosure obtain lock statistics (and analysis) at a subsystem level, thus reducing analysis time and human selection error, since all locks of interest are analyzed and only locks of interest are analyzed. Analysis of the obtained lock statistics may include any analysis as will occur to those of ordinary skill in the art.

Figure 1A:
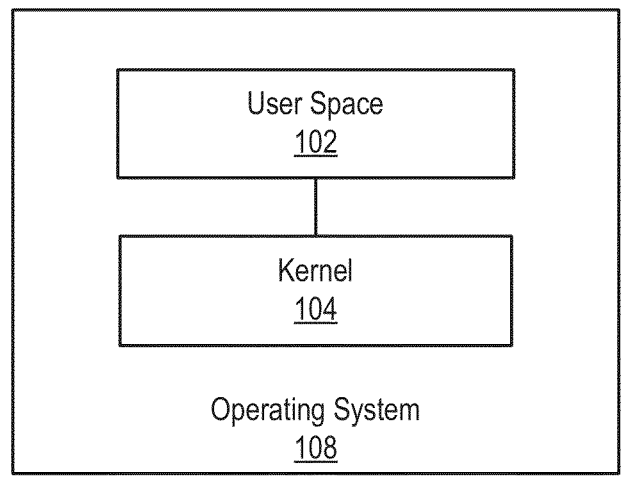
FIGS. 1A and 1B illustrate an environment of an operating system ('OS') in accordance with an embodiment of the present invention.
Figure 1B:
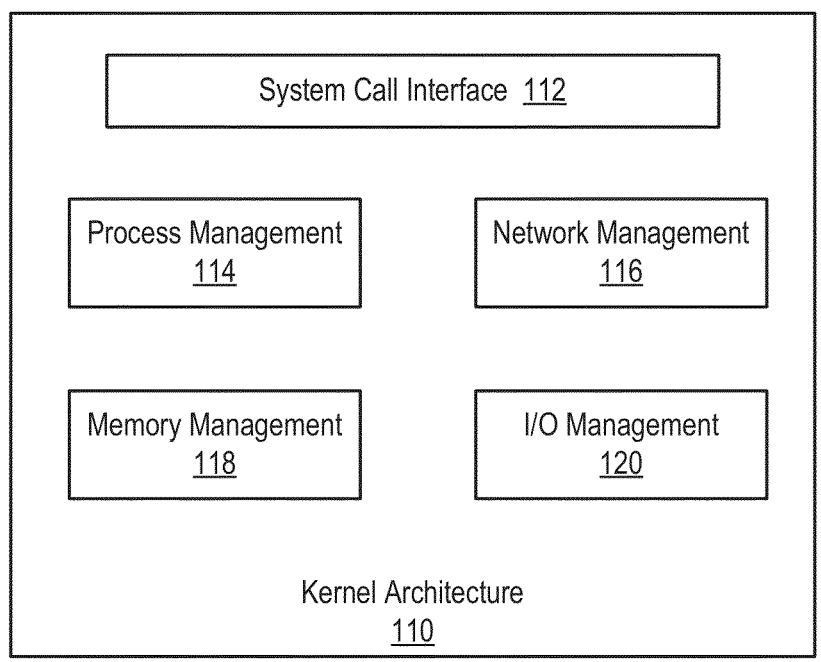

FIGS. 1A and 1B illustrate an environment of an operating system ('OS') in accordance with an embodiment of the present invention. OS 108 is a software platform that operates on a hardware platform of a data processing system ('computer'). OS 108 is responsible for management and coordination of activities and sharing of various resources on the computer. OS 108 may provide a user space 102 that acts as a host for application programs that run on the computer. Applications running in user space 102 may not have the capability to access resources directly. OS 108 may also include kernel 104, which operates the core processes of the OS 108, manages hardware components, and allocates resources to applications running in user space 102. Kernel 104 provides the lowest level of abstraction layer between the user space 102 and the hardware resources of the computer, such as memory, processors, and input/output devices.

The kernel architecture 110 may be implemented through various components. System call interface 112 is an interface between the user space 102 and a service provided by kernel 104. Process management 114 allows the execution of applications on the user space 102 and supports the applications with features such as hardware abstractions. The memory management 118 component defines processes to access the computer's memory and allows applications running in user space 102 to safely access the computer memory. Network management 116 defines processes for data communication with other computers and devices through a network. Input/output ('I/O') management 120 manages access to hardware devices. Each of the components listed above may be considered a subsystem of the operating system 108. In turn, each subsystem may be divided into further components.

The exemplary architecture above is provided only for illustration, not limitation. Operating system 108 may be implemented in various architectures as will occur to those of skill in the art, and the present disclosure may be applied to any architecture.

Figure 2:
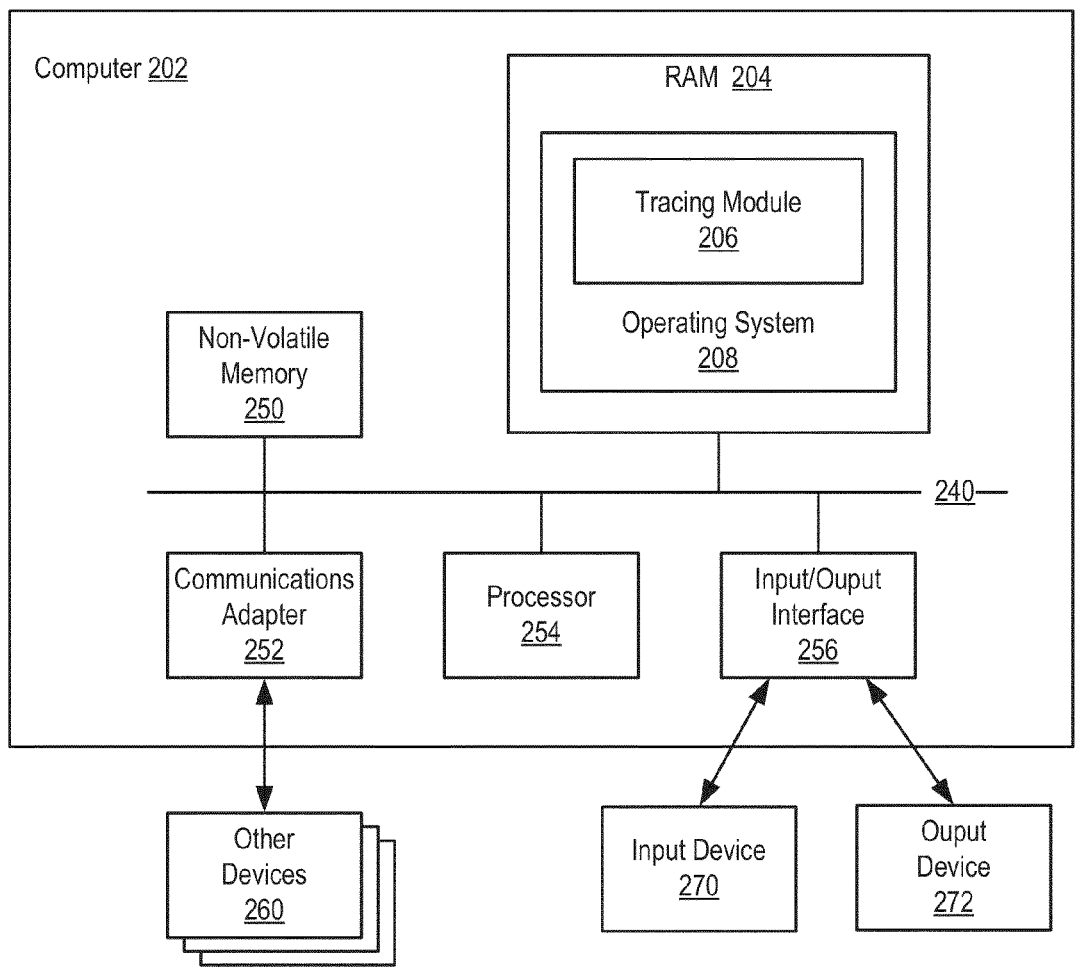
FIG. 2 sets forth a block diagram of an exemplary computer in accordance with an embodiment of the present invention.

Embodiments of the presently disclosed invention are implemented to some extent as software modules installed and running on one or more computers, such as servers, workstations, tablet computers, PCs, personal digital assistants ('PDAs'), smart phones, and so on. FIG. 2 sets forth a block diagram of an exemplary computer 202. Computer 202 includes at least one computer processor 254 as well as a computer memory, including both volatile random access memory ('RAM') 204 and some form or forms of non-volatile computer memory 250 such as a hard disk drive, an optical disk drive, or an electrically erasable programmable read-only memory space (also known as 'EEPROM' or 'Flash' memory). The computer memory may be connected through a system bus 240 to the processor 254 and to other system components. Thus, the software modules are program instructions stored in computer memory.

An operating system 208 is stored in computer memory. Operating system 208 may be any appropriate operating system such as Windows XP, Windows Vista, Mac OS X, UNIX, LINUX, or AIX from International Business Machines Corporation (Armonk, N.Y.).

Computing device 202 may also include one or more input/output interface adapters 256. Input/output interface adapters 256 may implement user-oriented input/output through software drivers and computer hardware for controlling output to output devices 272 such as computer display screens, as well as user input from input devices 270, such as keyboards and mice.

Computing device 202 may also include a communications adapter 252 for implementing data communications with other devices 260. Communications adapter 252 implements the hardware level of data communications through which one computer sends data communications to another computer through a network.

Also stored in computer memory is a tracing module 206, which may operate in kernel mode to generally implement lock tracing on abstract groupings of locks. Tracing module 206 may be implemented as one or more sub-modules operating in separate software layers or in the same layer. Although depicted as a separate module from the operating system in FIG. 2, the tracing module 206 or one or more of the sub-modules may be incorporated as part of the operating system 208. In some embodiments, the tracing module 206 may be implemented in the software stack, in hardware, in firmware (such as in the BIOS), or in any other manner as will occur to those of ordinary skill in the art.

Figure 3:
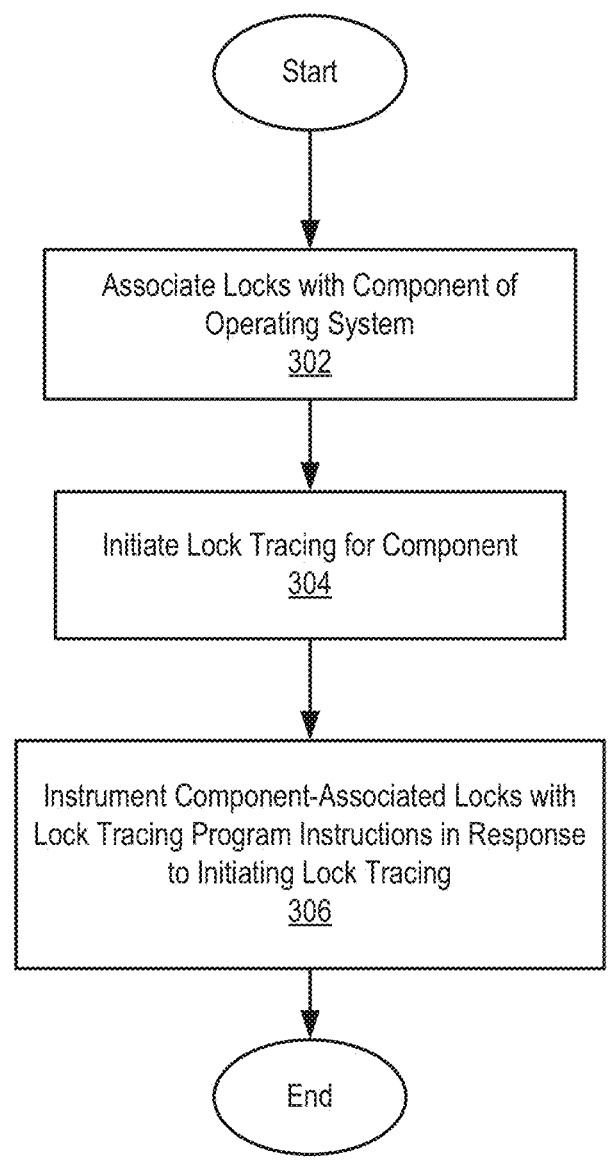
FIG. 3 is a data flow diagram illustrating a method for component lock analysis in accordance with one embodiment of the invention.

FIG. 3 is a data flow diagram illustrating one embodiment of a method for component lock tracing in accordance with one embodiment of the invention. The method of FIG. 3 begins by associating one or more locks with a component of the operating system (block 302). The locks are selected from a group of locks configured for use by an operating system and individually comprise locking code in any form, such as, for example, source code, machine code, object code, byte code, and so on. Associating the locks may be carried out by associating the locks in computer program code, such as, for example, altering computer program code to associate the locks with a component, as described further in FIGS. 4A and 4B, and may also include creating or altering specific data structures to create associations. Associating the locks with the component (block 302) may be carried out during development or at runtime, as is discussed below. Alternatively, a computer-implemented method may include providing a group of locks configured for use by an operating system, wherein one or more of the locks is associated with a component of the operating system, the locks individually comprising locking code.

A component of the operating system may be any abstraction of portions of the operating system (e.g., code segments, modules, functions, libraries, etc.). The abstraction may be functional, logical, architectural, or any other type of abstraction as will occur to those of skill in the art. Components of the operating system may include a subsystem of the operating system or more fine-grain components included in a subsystem.

A computer system, software entity, or user initiates lock tracing for the component (block 304). Initiating lock tracing for the component (block 304) may be carried out by accepting input designating the component for lock tracing and initiating lock tracing for the component in response to the input. The input could include electronic messages, commands, file input, or specific code included during development to activate component tracing.

In response to initiating the lock tracing, the operating system instruments the component-associated locks with lock tracing program instructions (block 306). Lock tracing program instructions may determine which thread acquired the lock, timestamps for when the lock was acquired and released, which threads waited after the lock was acquired, timestamps for when the threads began waiting, and so on.

In various embodiments, the method as generally disclosed above may be carried out in various implementations. In a first general embodiment, the component lock tracing is static. At development time, all the locks used by a component are grouped at a component level. In a second general embodiment, the component lock tracing is dynamic. Associating the locks with the component is carried out at development time but instrumenting the component-associated locks occurs dynamically at runtime. In other embodiments of the invention, associating the locks with the component is carried out during compile time, link time, or both.

Figure 4A:
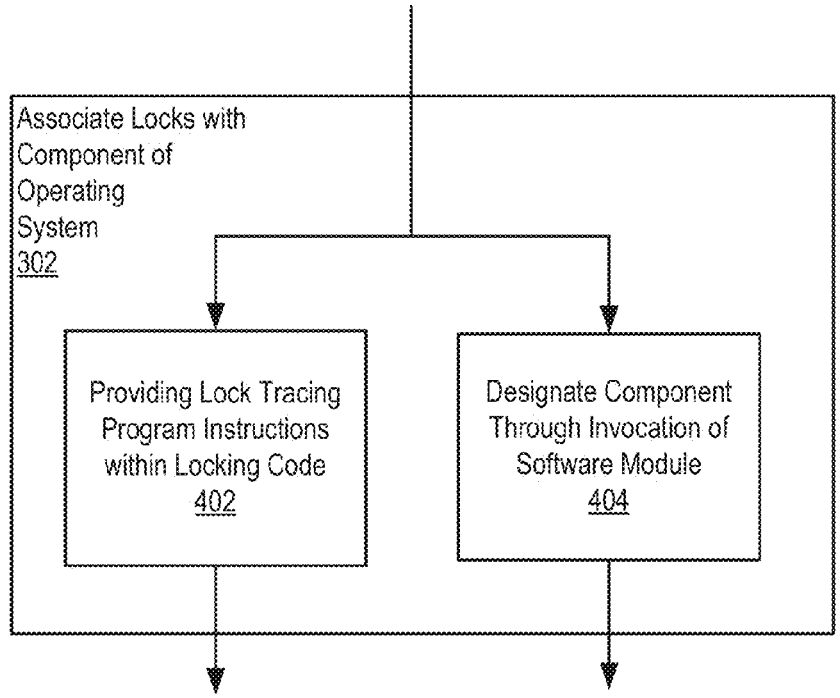
FIGS. 4A and 4B illustrate static component lock analysis in accordance with one embodiment of the invention.
Figure 4B:
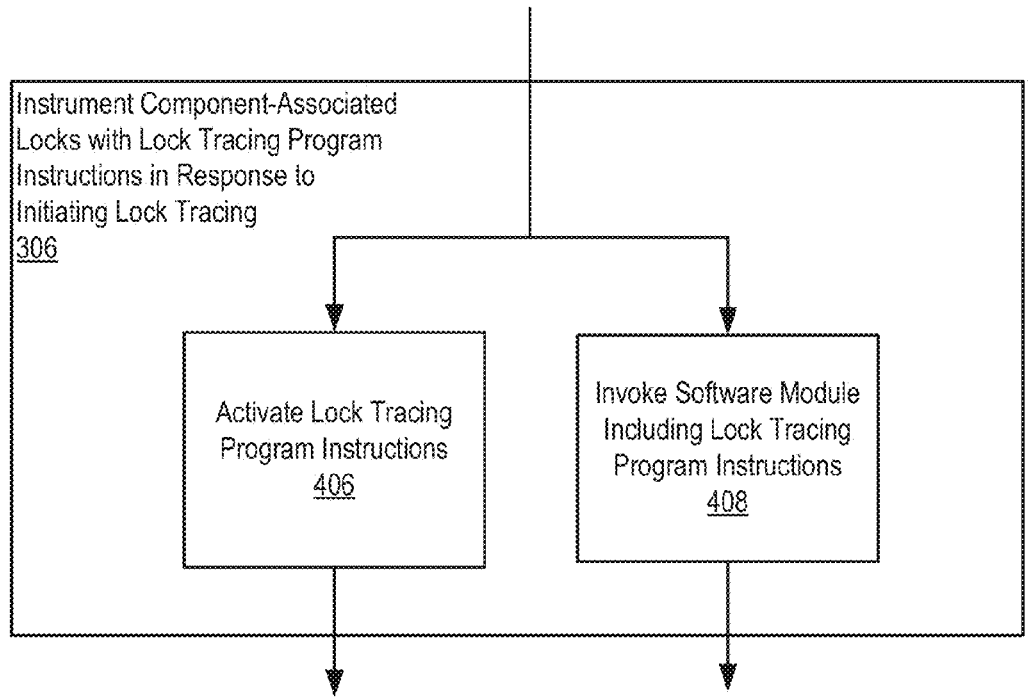

FIGS. 4A and 4B illustrate static embodiments of the present invention. FIG. 4A shows a data flow diagram illustrating embodiments of associating locks with a component of the operating system in accordance with one embodiment of the invention. In FIG. 4A, associating the locks with the component (block 302) may be carried out by providing lock tracing program instructions within the locking code of the locks for performing lock tracing on the locks (block 402). For example, lock tracing program instructions may be included that contain activation mechanisms indicating one or more components. These activation mechanisms may include flags or placeholders that may be armed upon initiating lock tracing for the component, as described above. Associating the locks with the component (block 302) may also be carried out by associating the locks with the component through an invocation of a software module. Activation mechanisms as described above may be incorporated into the invoking code or invoked module. This may include designating the component through the invocation (404).

Note that as defined herein, program instructions may be considered within the locking code if they immediately precede or follow the locking code or are functionally connected to the locking code such that any intervening code segments do not interfere with the designed trace functionality.

FIG. 4B shows a data flow diagram illustrating embodiments of instrumenting component-associated locks with lock tracing program instructions in response to initiating lock tracing in accordance with one embodiment of the invention. In FIG. 4B, instrumenting component-associated locks with lock tracing program instructions (block 306) may be carried out by activating the lock tracing program instructions (block 406). For example, if the lock tracing program instructions are embedded in locking code, they may be activated by setting a placeholder value equal to the component name designated in the lock tracing program instructions. Instrumenting component-associated locks with lock tracing program instructions (block 306) may also be carried out by invoking a software module including the lock tracing program instructions (block 408). The invoking code or invoked module may be armed using an activation mechanism as described above.

Figure 5:
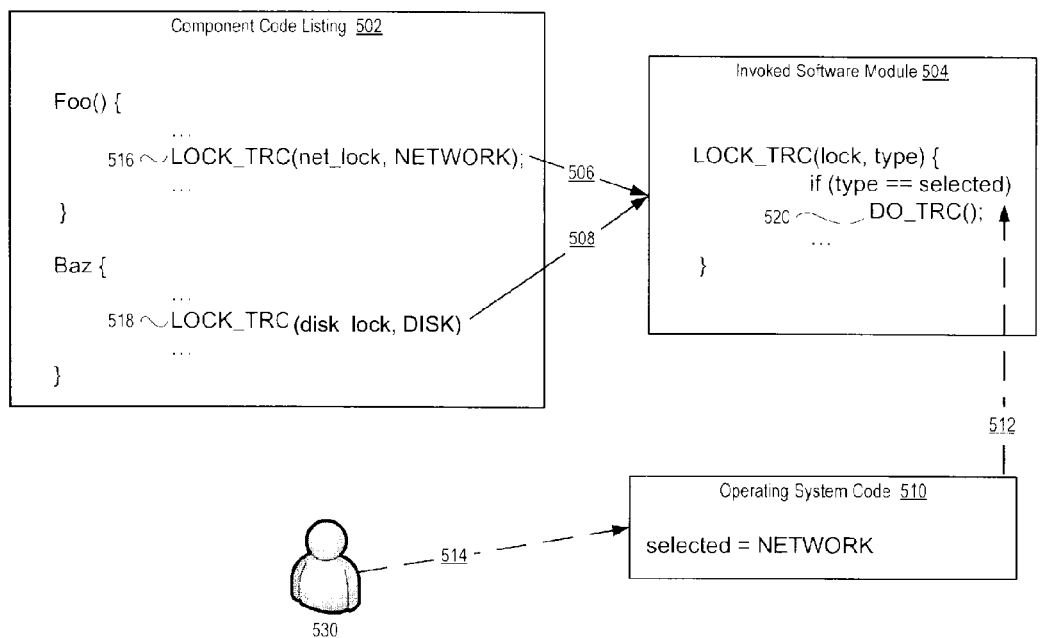
FIG. 5 shows exemplary code structures illustrating static component lock analysis in accordance with one embodiment of the invention.

FIG. 5 shows exemplary code structures illustrating a static embodiment of component lock tracing in accordance with one embodiment of the invention. The code structure includes component code 502, an invoked software module 504, and operating system code 510. Component code 502 includes component code listings Foo and Baz that each carry out various tasks to implement functionality. Foo contains an invocation 516 of the software module LOCK_TRC 504 and Baz contains an invocation 518 of the software module LOCK_TRC 504. The software module LOCK_TRC has two parameters: the parameter "lock" that contains the address of the locking data structure used (i.e., the lock itself), which is selected during development depending on the type of lock required, and the parameter "type" which is used as a placeholder which receives the component designation. The invocation 516 of software module 504 in Foo passes the argument "net_lock", which indicates the lock used by Foo, and the argument "NETWORK", which designates the component net_lock is associated with. A function Foo( ) may have several locks for different components in it. The invocation 518 of software module 504 in Baz is similar, except that it passes the arguments "disk_lock" (indicating the locking structure) and "DISK" (indicating that "disk_lock" is associated with the disk subsystem).

A developer 530 enters operating system code 510 (514) to initiate lock tracing for the specific component "NETWORK". The component "NETWORK" has been pre-defined by designating sections of component code 502 as being included in the component via the type parameter in the invocation discussed above. Upon invoking software module 504 (506, 508), software module 504 retrieves the value "NETWORK" (512) entered by the developer to fill the placeholder "selected" and determines whether the designated component (passed to it from the invocation) has been selected by comparing it against the value "NETWORK". Invoking the software module 504 from Foo (506), the values match, and software module 504 invokes tracing module DO_TRC 520. Invoking the software module 504 from Baz (508), the values do not match, and DO_TRC 520 is not called. By implementing the bulk of the lock tracing program instructions in DO_TRC 520, the only overhead is the check itself. The overhead associated with the tracing code is avoided when the component has not been selected.

Figure 6:
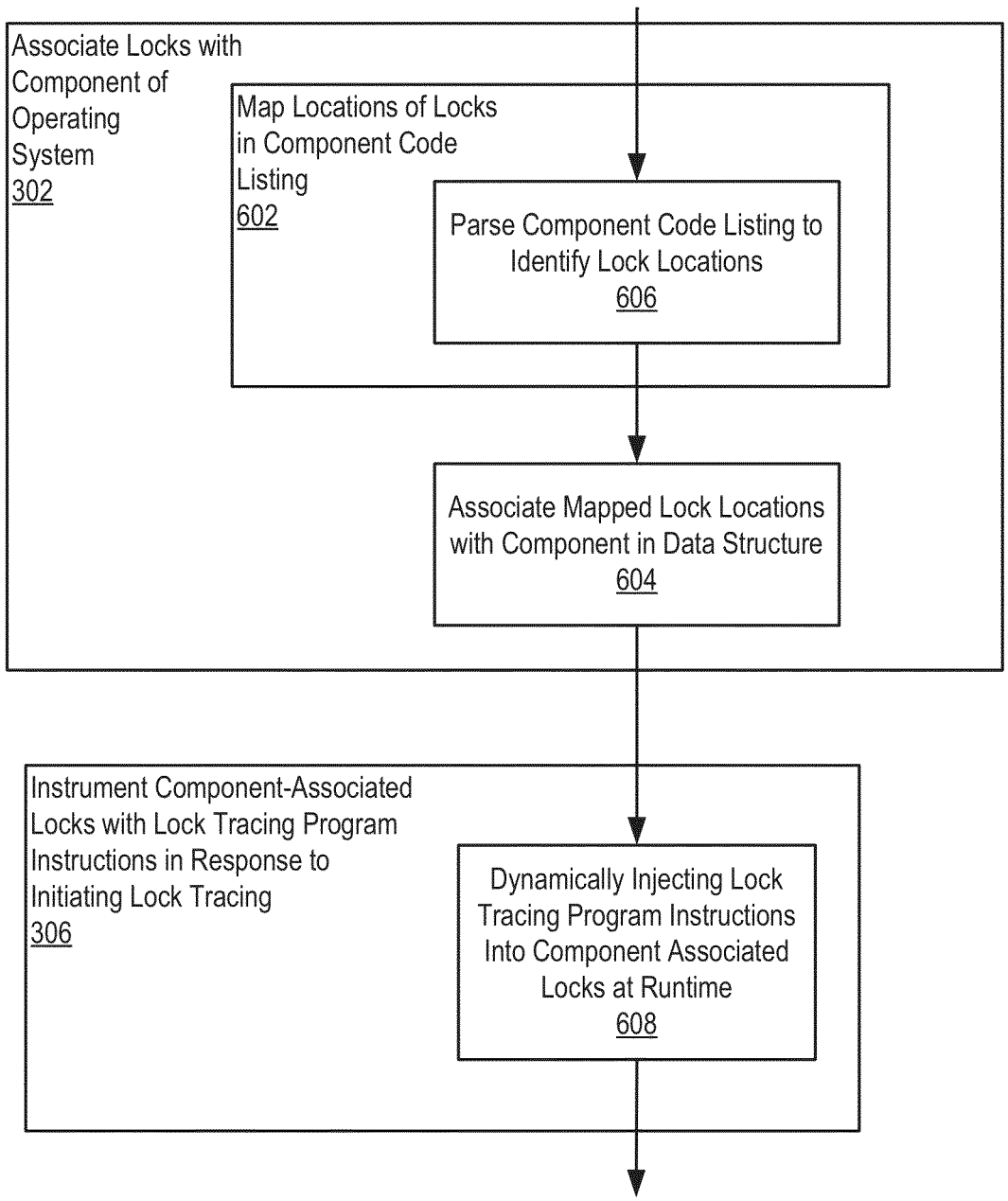
FIG. 6 shows a data flow diagram illustrating dynamic component lock analysis in accordance with one embodiment of the invention.

FIG. 6 shows a data flow diagram illustrating a dynamic embodiment of component lock tracing in accordance with one embodiment of the invention. The component comprises a component code listing. In FIG. 6, associating the locks with the component (block 302) may be carried out by mapping locations of locks in the component code listing (block 602) and associating the mapped lock locations with the component in a data structure (block 604). In some embodiments, a developer maps locations of locks in the component code listing (block 602) by parsing the component code listing to identify lock locations (block 606). This may also be done automatically. A dynamic trace tool, such as, for example, ProbeVue by IBM or DTrace by Solaris, instruments the component-associated locks with lock tracing program instructions (block 306) by dynamically injecting lock tracing program instructions into the component-associated locks at runtime (block 608). The lock tracing program instructions may include invocations to modules outside the injected code (as discussed with reference to FIG. 5). Alternatively, all of the tracing program instructions may be contained within the injected code. In the dynamic embodiment, no overhead is experienced when tracing is not enabled.

It should be understood that the inventive concepts disclosed herein are capable of many modifications. To the extent such modifications fall within the scope of the appended claims and their equivalents, they are intended to be covered by this patent.

What is claimed is:

1. A method for component lock analysis, comprising integrating non-transitory computer readable storage medium embodying a computer readable program into a computing system, wherein the program in combination with the computing system performs the following:
   associating, by operation of one or more computer processors, a component with all locks configured for use with the component, the component and the component-associated locks configured for use by an operating system, the component comprising a subsystem of the operating system, the locks individually comprising locking code;
   initiating lock tracing for the component for a particular lock instance in a particular component code listing, the component code listing invoking a software module, the invoked software module initiating lock tracing in response to a comparison of: (1) a component type parameter associated with the particular lock instance, and (2) a value indicating a component currently selected for lock tracing, wherein the component type parameter and the value indicating the component currently selected for lock tracing are retrieved by the invoked software module; and
   in response to initiating lock tracing, instrumenting the particular lock instance with lock tracing program instructions by invoking a tracing module to obtain lock statistics, the lock statistics consisting of lock statistics associated with the particular lock instance.

2. The method of claim 1 further comprising analyzing the obtained lock statistics.

3. The method of claim 1 wherein initiating lock tracing for the component comprises:
   accepting input designating the component for lock tracing, the input comprising the value indicating the component currently selected for lock tracing; and
   initiating lock tracing for the particular lock instance in the event that the component type parameter associated with the particular lock instance matches the value indicating the component currently selected for lock tracing.

4. The method of claim 1 wherein the component comprises a component code listing, and wherein associating the component with all locks configured for use with the component comprises:
   mapping locations of all locks configured for use with the component in the component code listing; and
   associating the mapped lock instance locations with the component in a data structure.

5. The method of claim 4 wherein mapping the locations of all locks configured for use with the component comprises parsing the component code listing to identify the lock locations.

6. The method of claim 1 wherein the associating the component with all locks configured for use with the component is executed at at least one of compile time and link time.

7. The method of claim 1 wherein the associating the component with all locks configured for use with the component is executed at runtime.

* * * * *